US012629712B2

(12) United States Patent
Koiwa

(10) Patent No.: US 12,629,712 B2
(45) Date of Patent: May 19, 2026

(54) ACCESSORY FOR SIDEWALL SPRINKLER HEAD

(71) Applicant: SENJU SPRINKLER CO., LTD., Tokyo (JP)

(72) Inventor: Yasuaki Koiwa, Tokyo (JP)

(73) Assignee: SENJU SPRINKLER CO., LTD., Tokyo (JP)

( * ) Notice: Subject to any disclaimer, the term of this patent is extended or adjusted under 35 U.S.C. 154(b) by 216 days.

(21) Appl. No.: 18/699,083

(22) PCT Filed: Oct. 20, 2022

(86) PCT No.: PCT/JP2022/039181

§ 371 (c)(1),
(2) Date: Apr. 5, 2024

(87) PCT Pub. No.: WO2023/068339

PCT Pub. Date: Apr. 27, 2023

(65) Prior Publication Data

US 2024/0408634 A1 Dec. 12, 2024

(30) Foreign Application Priority Data

Oct. 20, 2021 (JP) ................................ 2021-171286
Oct. 20, 2021 (JP) ................................ 2021-171287
Oct. 20, 2021 (JP) ................................ 2021-171288

(51) Int. Cl.

*B05B 15/68* (2018.01)
*A62C 31/02* (2006.01)
*A62C 35/68* (2006.01)
*A62C 37/20* (2006.01)
*B05B 15/16* (2018.01)

(52) U.S. Cl.

CPC .............. *B05B 15/68* (2018.02); *A62C 31/02* (2013.01); *A62C 35/68* (2013.01); *A62C 37/20* (2013.01); *B05B 15/16* (2018.02)

(58) Field of Classification Search

CPC ......... A62C 35/68; A62C 37/08; A62C 37/11; A62C 37/12; A62C 37/14; A62C 37/20;
(Continued)

(56) References Cited

U.S. PATENT DOCUMENTS 6,487,942 B1 * 12/2002 Carter ....................... B25B 7/02 81/426.5
7,185,567 B2 * 3/2007 Ide .......................... B25B 13/06 81/124.2
(Continued)

FOREIGN PATENT DOCUMENTS

JP H7-39859 U1 7/1995
JP 2003339900 A 12/2003
(Continued)

OTHER PUBLICATIONS

International Search Report for PCT Patent App. No. PCT/JP2022/039181 (Dec. 27, 2022).

*Primary Examiner* — Steven J Ganey
(74) *Attorney, Agent, or Firm* — Future IP LLC; Tomoko Nakajima

(57) ABSTRACT

When a sidewall sprinkler head is connected to a water pipe, the adjustment of the position of the sidewall sprinkler head having a deflector can be made more easily. A protective cap is configured to be mounted on or demounted from a sidewall sprinkler head having a deflector. The protective cap is formed as a tubular member configured to accommodate the sidewall sprinkler head. The tubular member includes tongue portions serving as an engagement portion and a second flat surface serving as an alignment indicator for accessory. The tongue portions serving as the engagement portion are configured to engage recesses 18 of the sidewall sprinkler head so as to turn together with the sidewall sprinkler head. The second flat surface serving as
(Continued)

the alignment indicator for accessory is configured to indicate the positional state of the deflector.

21 Claims, 11 Drawing Sheets

(58) Field of Classification Search
CPC ........... A62C 31/02; B05B 1/28; B05B 15/14; B05B 15/16; B05B 15/68; B25B 13/48
USPC .... 239/288–288.5, 518, 523; 169/37, 41, 51
See application file for complete search history.

(56) References Cited

U.S. PATENT DOCUMENTS

| | | | |
|---|---|---|---|
| 7,752,946 B2 | 7/2010 | Wang | |
| 8,052,187 B2 | 11/2011 | Orr et al. | |
| 8,960,319 B2 | 2/2015 | Orr et al. | |
| 2002/0129946 A1 | 9/2002 | Retzloff et al. | |
| 2006/0201286 A1 | 9/2006 | Ide | |
| 2012/0286067 A1* | 11/2012 | Orr | A62C 31/02 239/288.5 |
| 2013/0306334 A1 | 11/2013 | Koiwa | |
| 2015/0075334 A1 | 3/2015 | Watson et al. | |
| 2017/0326393 A1 | 11/2017 | Oldham et al. | |
| 2023/0057561 A1* | 2/2023 | Watson | B05B 15/16 |

FOREIGN PATENT DOCUMENTS

| | | | |
|---|---|---|---|
| JP | 2011120699 | A | 6/2011 |
| JP | 2012239572 | A | 12/2012 |
| JP | 2016002349 | A | 1/2016 |
| WO | WO2015/064224 | A1 | 5/2015 |

* cited by examiner

ACCESSORY FOR SIDEWALL SPRINKLER HEAD

This application is a national phase entry under 35 U.S.C. § 371 of PCT Patent Application No. PCT/JP2022/039181, filed on Oct. 20, 2022, which claims priority under 35 U.S.C. § 119 to Japanese Patent Application No. 2021-171286, filed Oct. 20, 2021, Japanese Patent Application No. 2021-171287, filed Oct. 20, 2021, and Japanese Patent Application No. 2021-171288, filed Oct. 20, 2021, all of which are incorporated by reference.

TECHNICAL FIELD

The present disclosure relates to an accessory for sidewall sprinkler head.

BACKGROUND ART

A sidewall sprinkler head is installed and buried in a wall of a building at a position near a ceiling. The term "side wall" here refers to a wall that extends in the up-down direction so as to intersect the ceiling or the floor of the building. A known example of the sidewall sprinkler head to be installed in the side wall is a sidewall sprinkler head of a flat and concealed type (for example, see Patent Literature 1).

The sidewall sprinkler head of Patent Literature 1 includes a sprinkler-head body, a heat-sensitive member, a deflector, and a cover plate. The sprinkler-head body includes a nozzle connected to a water pipe disposed at the back of the side wall (i.e., outside the room). The heat-sensitive member is disposed at the end of the sprinkler-head body opposite to the nozzle. The heat-sensitive member is positioned in a hole formed through the side wall so as to face the room. The cover plate is attached to the sprinkler-head body at the front surface of the side wall (i.e., room-side surface of the side wall). The cover plate, which is shaped like a disc, conceals the hole of the side wall and the heat-sensitive member from the room. Accordingly, the sidewall sprinkler head equipped with the cover plate is aesthetically excellent.

The sidewall sprinkler head has a protection area shaped rectangularly. The term "protection area" here refers to an area over which the sidewall sprinkler head can extinguish a fire. The deflector is a device serving to disperse the water discharged from the nozzle over the rectangular protection area. For this reason, the deflector has a complicated shape. According to Patent Literature 1, for example, the deflector is positioned closer to the floor than the central axis of the nozzle and disperses water over the protection area near the side wall. On the other hand, a deflector positioned closer to the ceiling than the central axis of the nozzle disperses water over the protection area away from the side wall. In order to disperse water over the protection area appropriately, it is necessary to connect the sidewall sprinkler head to the water pipe such that the deflector can be positioned correctly.

However, the sidewall sprinkler head is screw-connected to the water pipe. It is necessary to screw-connect the sidewall sprinkler head appropriately to the water pipe so as to position the deflector correctly. Otherwise, the sidewall sprinkler head cannot disperse water as designed, thereby failing to cover the required area of protection. For the correct positioning, the main body of the sidewall sprinkler head has a marker to indicate a top surface and an alignment indicator, such as a flat surface. However, when the sidewall sprinkler head is connected to the water pipe, a known alignment indicator is not easy to observe because the alignment indicator is often hidden by a protective cap or a socket wrench. When a building structure, such as a pillar, is close to the sidewall sprinkler head or the water pipe, it may be difficult to observe the alignment indicator or to place a level on the alignment indicator.

CITATION LIST

Patent Literature

PTL 1: U.S. Pat. No. 8,960,319

SUMMARY OF INVENTION

Technical Problem

The present disclosure is to provide a technique to facilitate the adjustment of the position of the sidewall sprinkler head and the deflector when the sidewall sprinkler head is connected to the water pipe.

Solution to Problem

According to an aspect of the present disclosure, an accessory for sidewall sprinkler head is provided. In an embodiment, the accessory for a sidewall sprinkler head is configured to be mounted on and demounted from the sidewall sprinkler head equipped with a deflector. The accessory includes a tubular member configured to accommodate the sidewall sprinkler head therein. The tubular member includes an engagement portion and an alignment indicator for accessory. The engagement portion is configured to engage the sidewall sprinkler head so as to turn together with the sidewall sprinkler head. The alignment indicator for accessory is configured to indicate a positional state of the deflector.

Advantageous Effects of Invention

According to an aspect of the present disclosure, the position of the sidewall sprinkler head and the deflector can be adjusted easily.

BRIEF DESCRIPTION OF DRAWINGS

The drawings for illustrating embodiments according to an aspect of the present disclosure will be described briefly. The drawings are provided to illustrate embodiments and are not intended to limit the scope of the present disclosure. Those skilled in the art can obtain other embodiments without difficulty on the bases of the drawings of the present disclosure.

DESCRIPTION OF EMBODIMENTS

Figure 1:
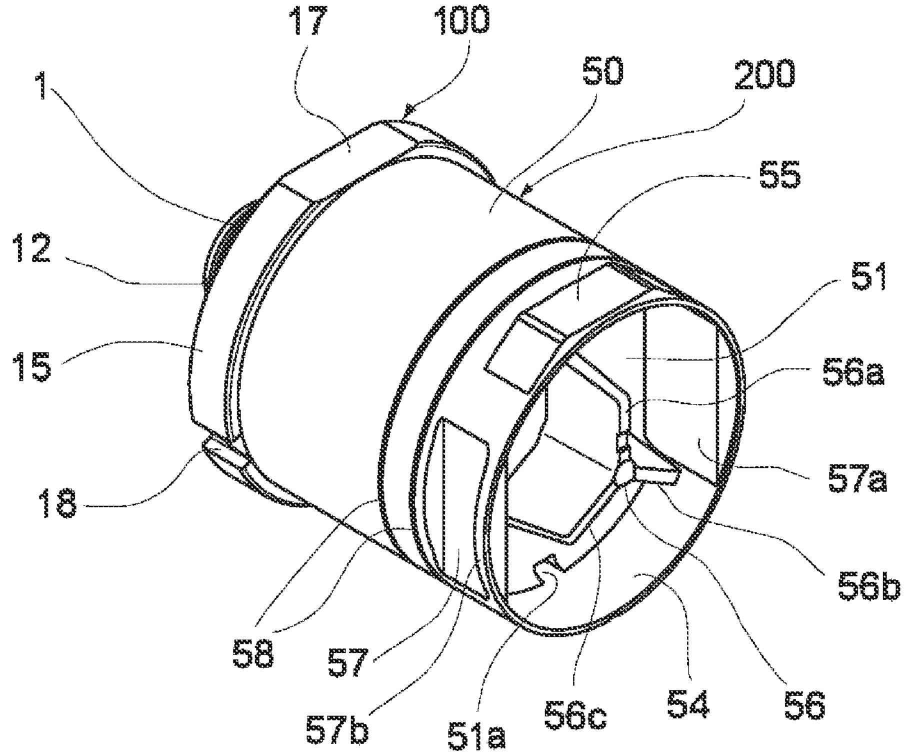
FIG. 1 is a perspective view illustrating a sidewall sprinkler head and a protective cap mounted on the sidewall sprinkler head.

Embodiments according to an aspect of the present disclosure will be described with reference to the drawings. The embodiments described below are not intended to limit the scope of the invention set forth in the appended claims. All the elements described in the embodiments are not necessarily indispensable for solving the technical problem posed herein.

Embodiments in the present disclosure may be combined with one another, and such a combination may constitute a new embodiment. Technical features in the present disclosure may be combined with one another to provide a new technical feature.

In the present disclosure, the term "or" is used in the context of inclusion relation. For example, a statement "A or B" includes "A", "B", and "A and B". In other words, "A", "B", and "A and B" independently satisfy the statement "A or B".

In the description of the present disclosure, the terms such as "to mount", "to join", "to connect", or "to fix" are used in their broader senses unless otherwise indicated clearly and specifically. For example, the term "to connect" includes "to fixedly connect", "to removably connect", "to detachably connect", or "to integrally connect". Moreover, the term "to connect" encompasses direct connection without any element interposed therebetween as well as indirect connection with any element interposed therebetween. In the present disclosure, those skilled in the art are expected to interpret the meanings of the above terms with reference to actual situations in which the terms are used.

In the present specification and appended claims, terms such as "first" and "second" are not used to imply a specific order nor superiority/inferiority but used to differentiate elements from one another. Elements commonly used in different embodiments and having the same advantageous effects are denoted by the same reference signs, and duplicated descriptions will be omitted.

In the description of the present disclosure, terms to describe directional and spatial relationships, such as "center", "vertical direction", "horizontal direction", "length", "width", "thickness", "up", "down", "front", "rear", "left", "right", "vertical", "horizontal", "top", "bottom", "inside", "outside", "clockwise", "counterclockwise", "axial direction", "radial direction", or "circumferential direction", are to be interpreted with reference to the drawings. These terms are used for the purpose of describing embodiments briefly and conveniently. Unless otherwise defined or specified clearly, these terms are not intended explicitly or implicitly to limit the orientation of a specific element when such an element is disposed or used nor to limit the scope of the present disclosure set forth in the claims.

In the present specification and appended claims, terms such as "about", "approximately", or "substantially" are used to include a numerical value and other numerical values in the vicinity thereof in the case of such terms modifying the numerical value. In the case of such terms modifying an element, such terms are used to include the element and other equivalent elements. For example, in the case of an expression "about three", this expression may include other numbers in the vicinity of "three" insofar as such inclusion does not contradict technical features and technical ideas of the present disclosure. In addition, the expression "B is substantially same as A" encompasses "B" that is identical to "A" as well as "B" that is similar to, but slightly different from, "A" insofar as such interpretation does not contradict technical features and technical ideas of the present disclosure.

Sidewall Sprinkler Head 100

An embodiment of the present disclosure will be described with reference to the drawings. A sidewall sprinkler head 100 includes a main body 1, a deflector 2, and a heat-sensitive member 3.

Figure 2:
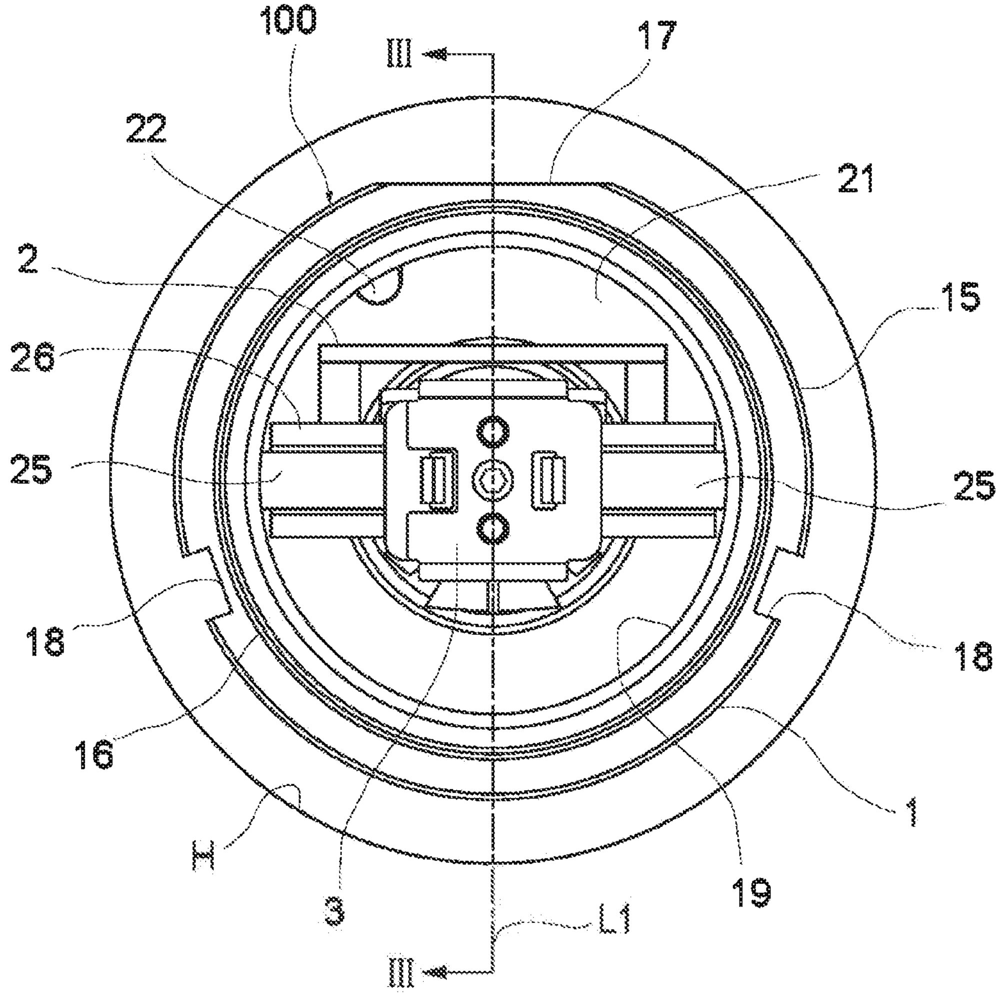
FIG. 2 is a front view illustrating the sidewall sprinkler head.
Figure 3:
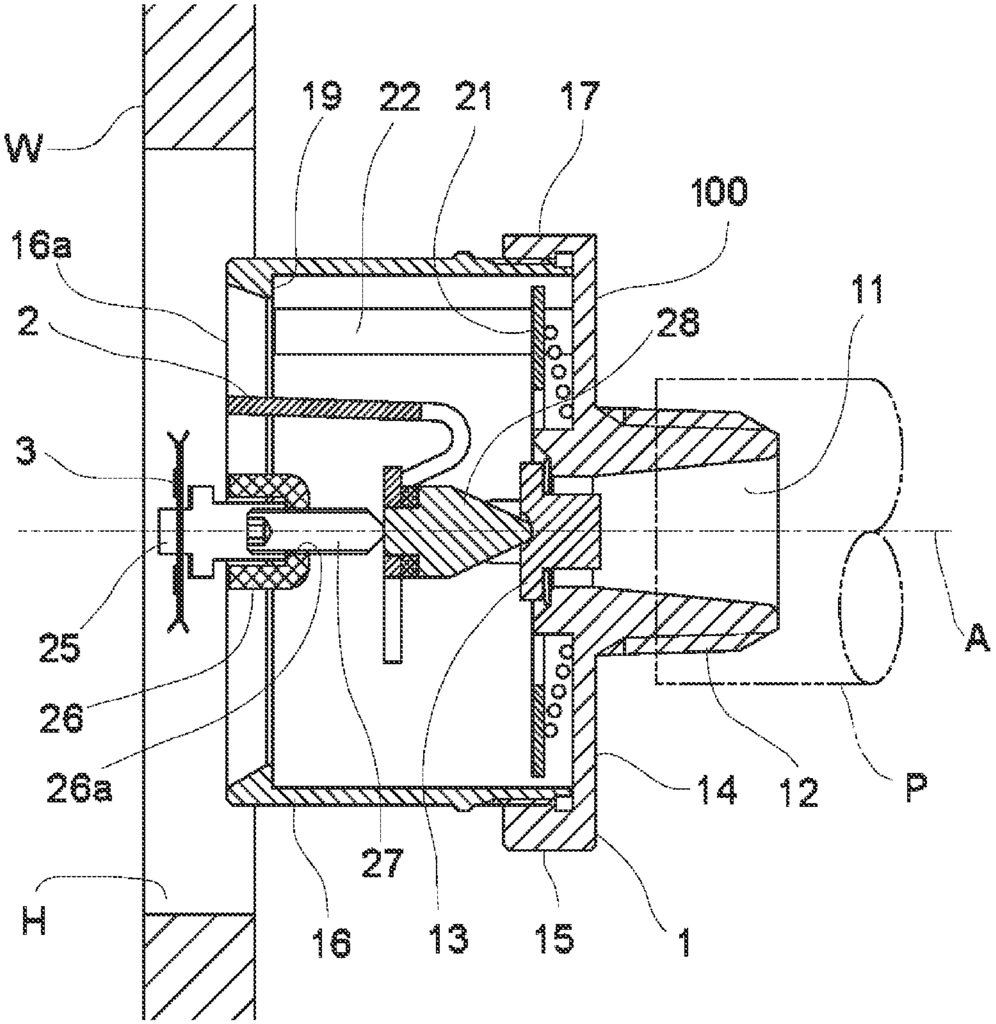
FIG. 3 is a cross-sectional view taken along line III-III in FIG. 2.

As illustrated in FIGS. 1 to 3, the main body 1 includes a nozzle 11. The nozzle 11 has a first end, and the first end is connected to a water pipe P installed at the back of a side wall W (outside the room). A male thread 12 for the connection to the water pipe P is formed on the outer peripheral surface of the nozzle 11 at the first end. An outlet of the nozzle 11 is positioned at a second end, which is the end opposite to the first end. The outlet of the nozzle 11 is closed by a disc 13.

The main body 1 includes a flange portion 14. The flange portion 14 is positioned between the outlet (the second end) of the nozzle 11 and the male thread 12 (the first end) of the nozzle 11. The flange portion 14 is shaped like a disc spreading outward. The main body 1 includes a tubular connection portion 15 formed at the edge of the flange portion 14. The tubular connection portion 15 is shaped like a hollow cylinder positioned away from the central axis A of the nozzle 11. A female thread is formed on the inner surface of the tubular connection portion 15. The female thread engages a male thread formed around a frame 16 at one end. Screw engagement between the male thread and the female thread connects the tubular connection portion 15 and the frame 16 to each other to form an integral structure.

The tubular connection portion 15 has a first flat surface 17 formed on the outer surface thereof. When the sidewall sprinkler head 100 is installed, the first flat surface 17 is positioned substantially horizontally. The first flat surface 17 serves as a "first alignment indicator" when the sidewall sprinkler head 100 is connected to the water pipe P. The first flat surface 17, which is formed on the main body 1, is otherwise referred to as an "alignment indicator for main body".

The sidewall sprinkler head 100 is connected appropriately to the water pipe P in such a manner that the deflector 2 is disposed at the right position to implement a design water sprinkling pattern. In this case, the first flat surface 17 comes to the top position (top surface) of the sidewall sprinkler head 100. Here, the "top surface" is a surface of the sidewall sprinkler head 100 facing upward in FIG. 2, which is a front view of the sidewall sprinkler head 100. In other words, the "top surface" is the surface of the sidewall sprinkler head 100 facing a ceiling of a building when the sidewall sprinkler head 100 is installed in a side wall W. The tubular connection portion 15 has multiple recesses (engagement grooves) 18. As illustrated in FIG. 2, the tubular connection portion 15 has two recesses 18 formed at the outer periphery thereof. As illustrated in FIG. 2, the two recesses 18 are formed in bilateral symmetry with respect to an imaginary line L1, which is a line drawn so as to pass through the central axis A of the nozzle 11 and orthogonally intersect the first flat surface 17.

The deflector 2 is accommodated inside the frame 16. As illustrated in FIG. 3, the deflector 2 is movable inside the frame 16 along the central axis A of the sidewall sprinkler head 100. The deflector 2 is accommodated inside the frame 16 in normal times when the heat-sensitive member 3 does not operate. When the heat-sensitive member 3 operates, the deflector 2 comes out of the frame 16. More specifically, in FIG. 3, the deflector 2 moves beyond the edge of the frame 16 near the side wall W and protrudes into the room.

The deflector 2 is joined to a guide ring 21 disposed inside the frame 16. In the normal times, the guide ring 21 is positioned near the flange portion 14. Once the heat-sensitive member 3 starts to operate, the heat-sensitive member 3 releases a pressing force exerted onto the disc 13 that plugs the outlet of the nozzle 11. As a result, the outlet opens, and the nozzle 11 starts to discharge water. The water from the nozzle 11 moves the deflector 2 in the frame 16 and causes the deflector 2 to protrude out of an open end 16*a* of the frame 16 near the side wall W. Subsequently, the guide ring 21 engages a step 19, which is formed at the open end 16*a* of the frame 16 so as to protrude inward. The deflector 2 is thereby prevented from moving further outward. The sidewall sprinkler head 100 has a pin 22 inside the frame 16. The guide ring 21 movably engages the pin 22. The pin 22, which engages the guide ring 21, prevents the deflector 2 from rotating about the central axis A of the sidewall sprinkler head 100 when the deflector 2 moves.

The deflector 2 has a bilaterally symmetrical shape with respect to the imaginary line L1 in FIG. 2. This enables the sidewall sprinkler head 100 to disperse water uniformly over a protection area. The sidewall sprinkler head 100 is screw-connected to the water pipe P. The deflector 2 should be positioned so as to keep bilateral symmetry during the screw connection. Accordingly, the horizontal position of the deflector 2 is adjusted by adjusting the position of the first flat surface 17 using a level, which is placed on the first flat surface 17. FIG. 2 illustrates a state in which the deflector 2 is positioned correctly. In other words, when the sidewall sprinkler head 100 is viewed in a direction as illustrated in FIG. 2, the first flat surface 17 and the deflector 2 are positioned parallel to each other. Accordingly, when the first flat surface 17 looks horizontal, the deflector 2 is in a horizontal position correctly as illustrated in FIG. 2. When the first flat surface 17 looks substantially horizontal, the sidewall sprinkler head 100 can disperse water uniformly over the protection area.

In the present disclosure, for example, the deflector 2 illustrated in FIG. 3 inclines slightly upward as it goes from the base end to the tip end thereof along the central axis A of the sidewall sprinkler head 100. The deflector 2, however, may incline upward or downward or may extend horizontally. Regarding the correct positioning of the deflector 2, it is sufficient that the front edge of the deflector 2 looks substantially horizontal as viewed in the direction as illustrated in FIG. 2. The position of the deflector 2 of the present disclosure is not limited to that illustrated in FIG. 3, in other words, the deflector 2 is positioned above the central axis A. The deflector 2 may be positioned below the central axis A in FIG. 3 or may include an upper portion positioned above the central axis A and a lower portion positioned below the central axis A.

The heat-sensitive member 3 is supported by the frame 16. More specifically, the heat-sensitive member 3 is held by a pair of levers 25 that are supported by the frame 16. One end of each lever 25 (i.e., the outer end near the frame 16) engages the step 19 of the frame 16, and the other end of the lever 25 (i.e., the inner end near the heat-sensitive member 3) engages a hole formed in the heat-sensitive member 3. The heat-sensitive member 3 is disposed so as to project outward from the open end 16*a* of the frame 16. A saddle 26 and a screw 27, which serve as "support members", are disposed between the disc 13 and the pair of the levers 25.

As illustrated in FIG. 3, the saddle 26 is elongated like a bar having a U-shaped cross section, and the levers 25 are accommodated inside the U-shaped bar. As illustrated in FIG. 3, a threaded hole 26*a* having a female thread is formed at the center of the saddle 26, and the screw 27 engages the threaded hole 26*a*. As illustrated in FIG. 3, by turning the screw 27 in the threaded hole 26*a* to proceed toward the disc 13, the screw 27 comes into contact with a boss 28 and causes the boss 28 to press the disc 13 against the nozzle 11. As a result, the boss 28 supports the disc 13 that closes the outlet of the nozzle 11 liquid-tightly. Simultaneously, the screw 27 presses the saddle 26 and the levers 25 accommodated therein, thereby exerting a force to each lever 25 in a direction in which the link-side end of the lever 25 (the end near the heat-sensitive member 3) rotates with the other end of the lever 25 at the step 19 serving as a fulcrum so as to move away from the other lever 25.

The heat-sensitive member 3 is a link mechanism in which two thin metallic plates are adhered together using a fusible alloy. The heat of a fire melts the fusible alloy, the force that the saddle 26 is applying to the levers 25 rotates the levers 25 and causes the two metallic plates to separate from each other. As a result, the levers 25 come off from the frame 16. This detaches the disc 13 from the outlet of the nozzle 11 to open the nozzle 11.

In the sidewall sprinkler head 100 described above, the surface of the deflector 2 and the first flat surface 17 are both disposed horizontally without rotating relative to each other about the central axis A. During the assembly of the sidewall sprinkler head 100, the screw 27 is tightened to press the boss 28 against the disc 13. During the assembly, the deflector 2 and the first flat surface 17 are both maintained so as not to rotate about the central axis A.

Accessory for Sidewall Sprinkler Head 100

Accessories for the sidewall sprinkler head 100 will be described through embodiments. More specifically, a protective cap 200, a cover plate 400, and tools (such as a wrench 300 and a demounting tool 500) will be described as examples of the accessories of the sidewall sprinkler head 100.

Protective Cap 200 (see FIGS. 4 to 7)

In an embodiment, the accessory is a protective cap 200.

Figure 4:
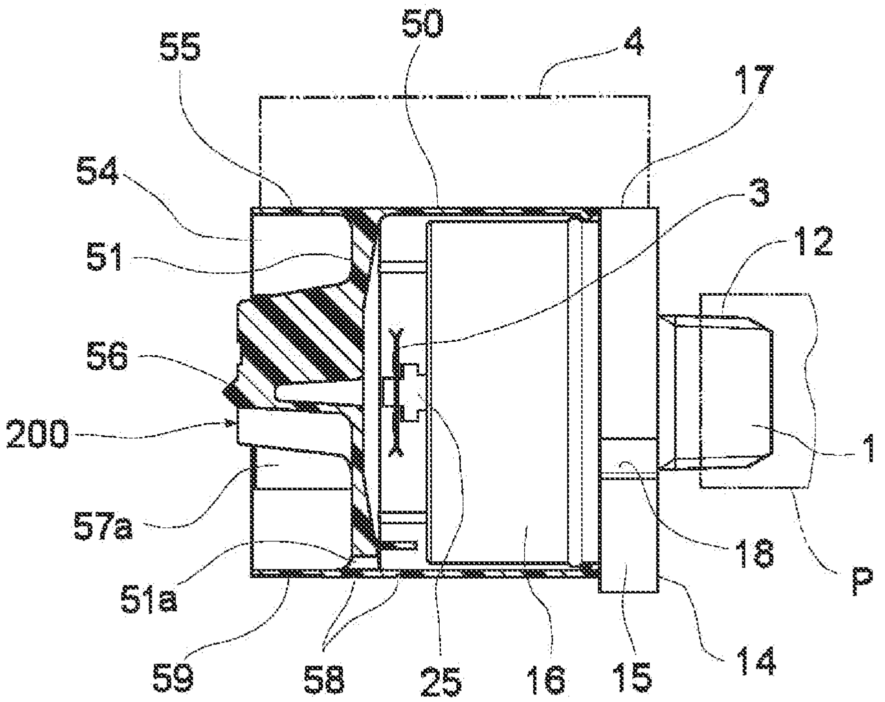
FIG. 4 is a cross-sectional view illustrating the protective cap mounted on the sidewall sprinkler head.

The protective cap 200 is mounted on the sidewall sprinkler head 100 in order to protect the sidewall sprinkler head 100 against external forces, dust, or paint (see FIG. 4). The protective cap 200 is normally mounted on the sidewall sprinkler head 100 in a factory and is removed after the sidewall sprinkler head 100 is connected to the water pipe P during installation.

The protective cap 200 is formed as a "tubular member" in which the whole or part of the sidewall sprinkler head 100 can be accommodated. The "tubular member" includes an "engagement portion" and an "alignment indicator for accessory", which will be described later.

The "engagement portion" is structured so as to be able to engage the sidewall sprinkler head 100 and so as to be able to turn together with the sidewall sprinkler head 100. The "alignment indicator for accessory" is structured so as to be able to indicate the positional state of the deflector 2 of the sidewall sprinkler head 100, in other words, to indicate the occurrence of deviation from the right position.

More specifically, as illustrated in FIGS. 4 to 7, the protective cap 200 is shaped tubularly and has a closed surface 51 formed at one end and an opening 52 at the other end. The heat-sensitive member 3 and the frame 16 can be accommodated inside the opening 52.

Tongue portions 53 are formed at the opening 52. The tongue portions 53 project from the edge of the opening 52. The tongue portions 53 are formed at respective positions of the two recesses 18 of the main body 1. Accordingly, the tongue portions 53 engage respective recesses 18 when the protective cap 200 is mounted on the sidewall sprinkler head 100. The tongue portions 53 serve as the "engagement portions" that enable the protective cap 200 to engage the main body 1 and to turn together with the main body 1. In the state of the tongue portions 53 engaging the recesses 18, the first flat surface 17 and a second flat surface 55 (to be described later) are positioned on the same plane.

The protective cap 200 has a peripheral wall 50 shaped tubularly. A peripheral-wall extension 54 is also formed at the peripheral wall 50. The peripheral-wall extension 54 extends tubularly from the closed surface 51. The peripheral-wall extension 54 has a second flat surface 55. When the sidewall sprinkler head 100 is installed, the second flat surface 55 is positioned substantially horizontally. The sidewall sprinkler head 100 is connected to the water pipe P in such a manner that the deflector 2 is disposed at the right position to implement a design water sprinkling pattern. In this case, the second flat surface 55 comes to the top position (top surface) of the sidewall sprinkler head 100. In other words, when the sidewall sprinkler head 100 with the protective cap 200 mounted thereon is viewed as illustrated in FIG. 2, the second flat surface 55 and the deflector 2 are positioned parallel to each other. Accordingly, when the second flat surface 55 of the protective cap 200 looks horizontal, the deflector 2 in the protective cap 200 is in a horizontal position correctly as illustrated in FIG. 2. Accordingly, the second flat surface 55 can serve as the "first alignment indicator" as is the case for the first flat surface 17.

The second flat surface 55 is an example of the "alignment indicator for accessory" that the accessory of the sidewall sprinkler head 100 includes. The second flat surface 55, which is formed on the protective cap 200, is otherwise referred to as an "alignment indicator for protective cap".

The second flat surface 55 is formed so as to be parallel to the first flat surface 17. When the protective cap 200 is mounted on the sidewall sprinkler head 100, the first flat surface 17 and the second flat surface 55 form a single flat surface (horizontal surface) without having a step or a slope therebetween. In other words, the first flat surface 17 and the second flat surface 55 form an expanded flat surface so that a level 4 can be placed thereon. The second flat surface 55 expands the first flat surface 17 into a larger flat surface, which facilitates correct level measurement. As described above, the protective cap 200 has the second flat surface 55, and when the protective cap 200 is mounted on the sidewall sprinkler head 100, the second flat surface 55 serves as an expanded flat surface expanded from the first flat surface 17 that is the "first alignment indicator" of the sidewall sprinkler head 100.

Figure 5:
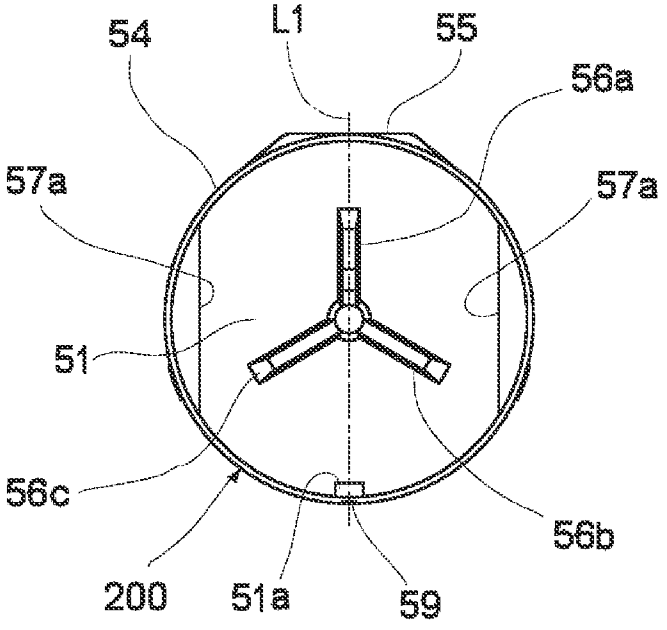
FIG. 5 is a front view of the protective cap.

A projection 56 is formed on the closed surface 51 so as to project along the central axis A of the nozzle 11. As illustrated in FIG. 5, the projection 56 includes Y-shaped walls, in other words, wall segments 56*a*, 56*b*, and 56*c*, extending in three directions from the central axis A of the nozzle 11. The projection 56 serves as a grip to be used when a worker holds the protective cap 200. The wall segments 56*a*, 56*b*, and 56*c* are disposed about the central axis A equiangularly (by 120°) apart from each other.

The wall segment 56*a* is formed as a "vertical projection" extending in a direction normal to the second flat surface 55. Accordingly, the wall segment 56*a* can serve as a "second alignment indicator" to be used for adjusting the deflector 2 to the right position. More specifically, the position of the sidewall sprinkler head 100 is adjusted relative to the water pipe P by aligning the wall segment 56*a* with a thread having a weight at the end. As a result, the deflector 2 is adjusted to the right position.

The wall segment 56*a* is an example of the "second alignment indicator". The peripheral-wall extension 54 has vertical grooves 57 formed as parts of the outer peripheral surface of the peripheral-wall extension 54. The vertical grooves 57 extend vertically in the direction normal to the second flat surface 55. The vertical grooves 57 are other examples of the "second alignment indicator". As illustrated in FIG. 5, the vertical grooves 57 are shaped in bilaterally symmetry with respect to the imaginary line L1. As is the case for the wall segment 56*a*, the position of the bottom surface 57*a* of each vertical groove 57 is adjusted by using a thread having a weight at the end and aligning the bottom surface 57*a* with the thread. As a result, the deflector 2 is adjusted to the right position. The vertical grooves 57 can be used as a "catch" to be held by fingers or a tool when the protective cap 200 is removed from the sidewall sprinkler head 100.

The vertical projection (the wall segment 56*a*) and the vertical grooves 57 have the following technical significance. As illustrated in FIG. 3, the first flat surface 17 of the main body 1 is positioned behind the side wall W. In addition, the side wall W is normally constructed after the sidewall sprinkler head 100 is coupled to the water pipe P. Accordingly, after the side wall W is constructed, a worker cannot place a level on the first flat surface 17 from the inside of the room to determine horizontality. However, the vertical projection (the wall segment 56*a*) and the vertical grooves 57 are positioned in the direction normal to the first flat surface 17 (i.e., the first alignment indicator) when the protective cap 200 is mounted on the main body 1 so as to be able to turn together. Accordingly, even if the first flat surface 17 cannot be used after the side wall W is constructed, the vertical projection (the wall segment 56*a*) and the vertical grooves 57 can be used to position the deflector 2 correctly. More specifically, when the sidewall sprinkler head 100 with the protective cap 200 mounted thereon is viewed as illustrated in FIG. 2, the vertical projection (the wall segment 56*a*) and the vertical grooves 57 are positioned so as to extend in the direction normal to the deflector 2. Accordingly, if the vertical projection (the wall segment 56*a*) and the vertical grooves 57 of the protective cap 200 look vertical relative to the floor or the ceiling of the building, the deflector 2 accommodated in the protective cap 200 is in the horizontal position correctly as illustrated in FIG. 2.

Figure 6:
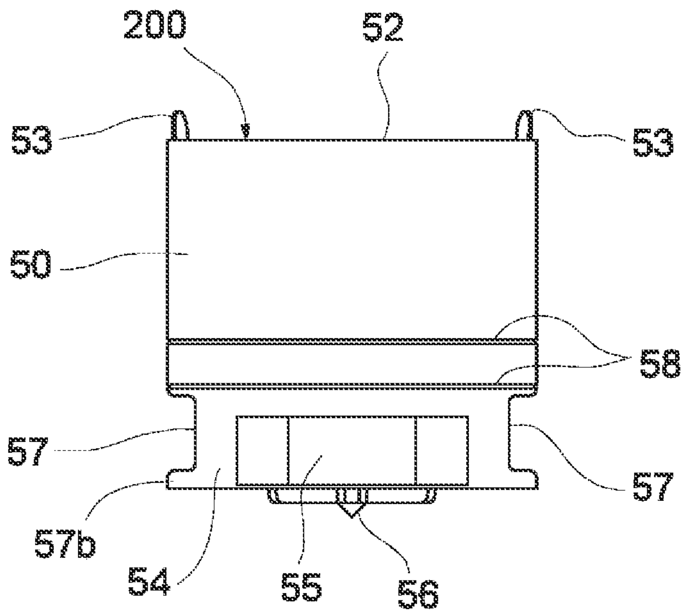
FIG. 6 is a plan view of the protective cap.

As illustrated in FIG. 6, the peripheral wall 50 of the protective cap 200 has a first installation guide marker 58. The first installation guide marker 58 indicates an acceptable range of the installation position of the sidewall sprinkler head 100 with respect to the room-side surface of the side wall W facing inside the room. The sidewall sprinkler head 100 should be connected to the water pipe P such that the room-side surface of the side wall W comes within the range of the first installation guide marker 58. In the example illustrated in FIG. 6, the first installation guide marker 58 is grooves formed circumferentially around the peripheral wall 50. The first installation guide marker 58, however, may be made of a projection, discontinuous grooves, a pattern, a letter, or a color marking, or a combination of these.

Figure 7:
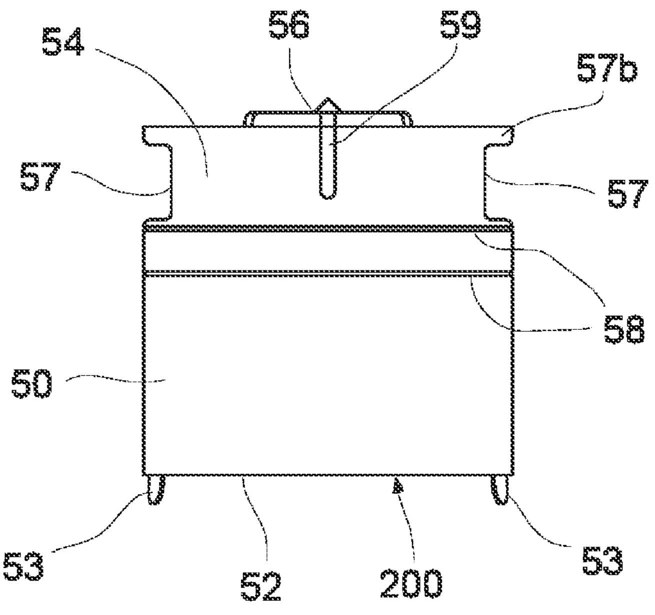
FIG. 7 is a bottom view of the protective cap.
Figure 8:
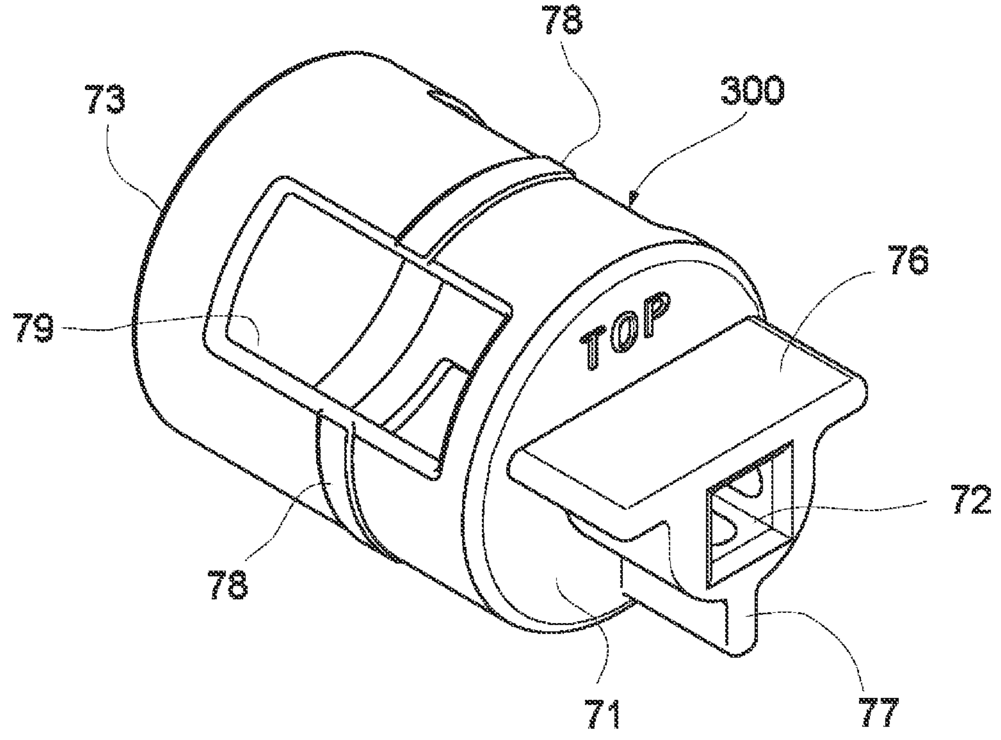
FIG. 8 is a perspective view illustrating a wrench.
Figure 9:
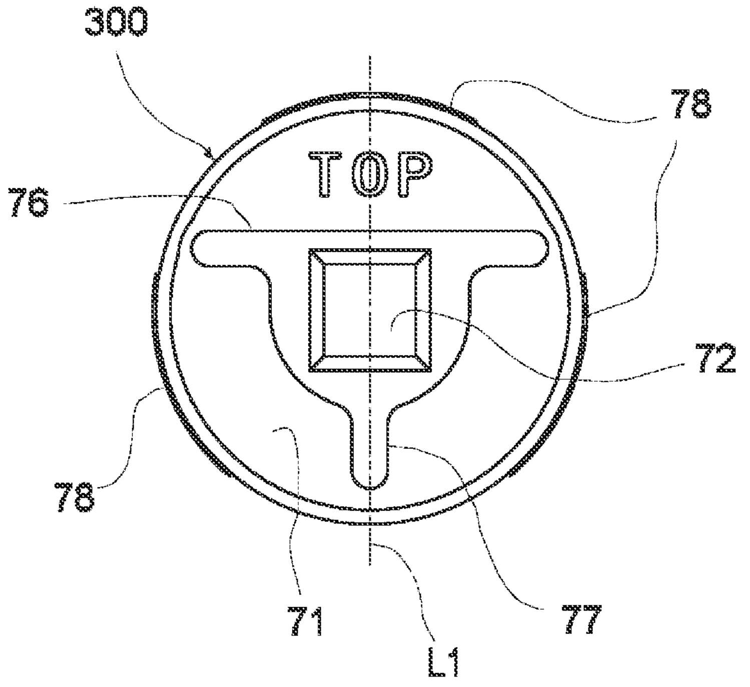
FIG. 9 is a bottom view of the wrench.
Figure 10:
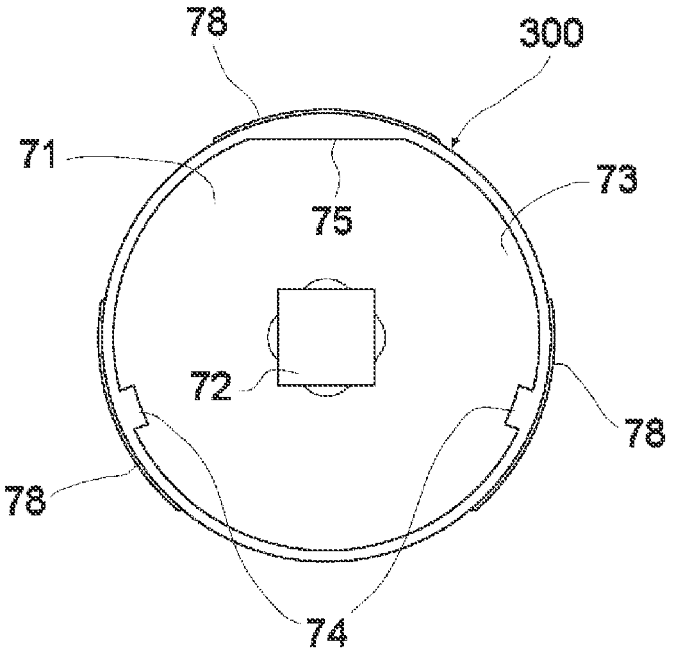
FIG. 10 is a plan view of the wrench.
Figure 11:
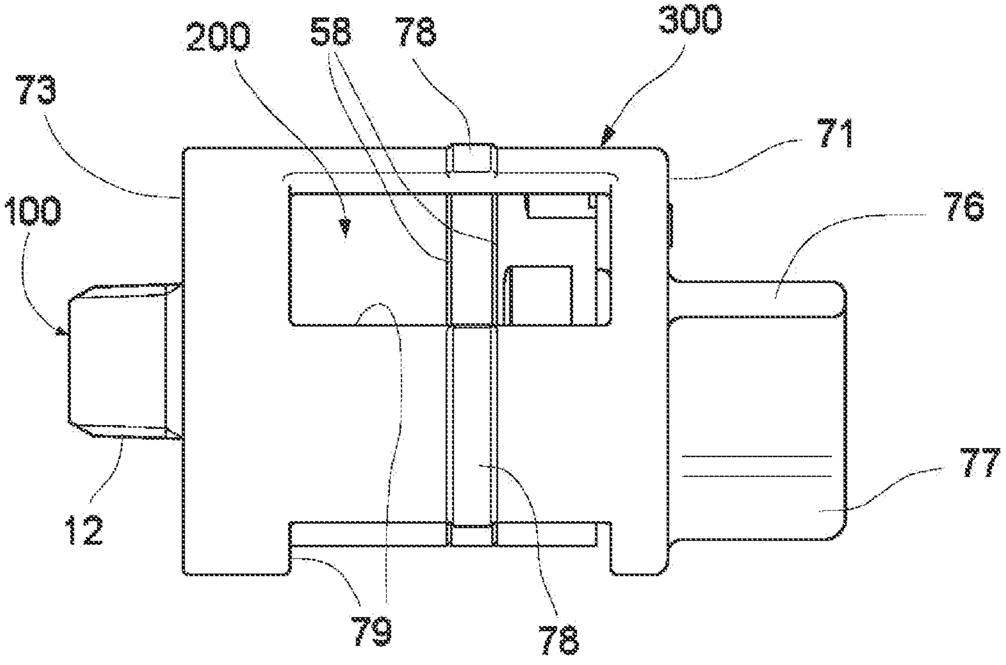
FIG. 11 is a side view of the wrench in which the sidewall sprinkler head with the protective cap is accommodated.

As illustrated in FIGS. 5 and 7, a groove 59 is formed at the outer surface of the peripheral-wall extension 54. The groove 59 is formed at the outer surface of the peripheral-wall extension 54 at a position on the imaginary line L1 that passes through the wall segment 56*a*, which extends in the direction normal to the second flat surface 55. The groove 59 is positioned so as to face the floor when the deflector 2 is positioned correctly. Accordingly, the groove 59 is another example of the "second alignment indicator". A drain hole 51*a* is formed through the closed surface 51 at a position near the groove 59.

The vertical projection (the wall segment 56*a*), the vertical grooves 57, and the groove 59 are examples of the "alignment indicator for accessory" that the accessory of the sidewall sprinkler head 100 includes. The vertical projection (the wall segment 56*a*), the vertical grooves 57, and the groove 59, which are formed in the protective cap 200, are also examples of the "alignment indicator for protective cap".

Wrench 300 (see FIGS. 8 to 11)

In an embodiment, the accessory is a wrench 300. The wrench 300 is used to connect the sidewall sprinkler head 100 to the water pipe P.

As is similar to the protective cap 200, the wrench 300 is formed as the "tubular member" in which the whole or part of the sidewall sprinkler head 100 can be accommodated. As is similar to the protective cap 200, the "tubular member" includes the "engagement portion" and the "alignment indicator for accessory", which will be described later.

The "engagement portion" is structured so as to be able to engage the sidewall sprinkler head 100 and so as to be able to turn together with the sidewall sprinkler head 100. The "alignment indicator for accessory" is structured so as to be able to indicate the positional state of the deflector 2 of the sidewall sprinkler head 100, in other words, to indicate the occurrence of deviation from the right position.

More specifically, as illustrated in FIGS. 8 to 11 by way of example, the wrench 300 is shaped tubularly and has a bottom portion 71 at one end and has a rectangular hole 72 formed at the center of the bottom portion 71. The other end of the wrench 300 is an opening 73. Projections 74 and a flat surface 75 are formed on the inner peripheral surface of the wrench 300. The projections 74 can engage respective recesses 18 of the main body 1, and the flat surface 75 can engage the first flat surface 17 of the main body 1. More specifically, the projections 74 engage the recesses 18, which prevents the wrench 300 from rotating about the central axis A relative to the sidewall sprinkler head 100 and enables the wrench 300 and the sidewall sprinkler head 100 to turn together. In addition, the flat surface 75 engages the first flat surface 17, which prevents the wrench 300 from rotating about the central axis A relative to the sidewall sprinkler head 100 and enables the wrench 300 and the sidewall sprinkler head 100 to turn together. Accordingly, the projections 74 and the flat surface 75 serve as the "engagement portions" for engaging the main body 1.

The wrench 300 has a third flat surface 76. The third flat surface 76 is formed as the top surface of a columnar projection through which the hole 72 is formed. The third flat surface 76 can serve as the "first alignment indicator" as is the case for the second flat surface 55 of the protective cap 200.

The third flat surface 76 is an example of the "alignment indicator for accessory" that the accessory of the sidewall sprinkler head 100 includes. The third flat surface 76, which is formed on the wrench 300, is otherwise referred to as an "alignment indicator for wrench".

The wrench 300 has a vertical portion 77 formed so as to extend in a direction normal to the third flat surface 76. The vertical portion 77 serves as the "vertical projection". The vertical portion 77 can function as the "second alignment indicator" since the vertical portion 77 can provide the same effect as does the wall segment 56*a* that serves as the vertical projection. The vertical portion 77 is also an example of the "alignment indicator for accessory" and an example of the "alignment indicator for wrench".

More specifically, the sidewall sprinkler head 100 is accommodated in the wrench 300 and the projections 74 and the flat surface 75, which are the "engagement portions" for the engagement with the main body 1, engage the recesses 18 and the first flat surface 17 of the main body 1. In this state, the vertical portion 77 (the second alignment indicator) of the wrench 300 extend in a direction normal to the first flat surface 17 (the first alignment indicator). In addition, the third flat surface 76 (the first alignment indicator) of the wrench 300 orthogonally intersects the vertical portion 77.

Since the wrench 300 has the third flat surface 76 and the vertical portion 77, the alignment indicators (the third flat surface 76 and the vertical portion 77) for adjusting the deflector 2 to the right position are observable even if the sidewall sprinkler head 100 is accommodated inside the wrench 300. In other words, when the sidewall sprinkler head 100 with the wrench 300 mounted thereon is viewed as illustrated in FIG. 2, the third flat surface 76 and the deflector 2 are positioned parallel to each other. Simultaneously, the vertical portion 77 is positioned so as to orthogonally intersect the deflector 2. Accordingly, when the third flat surface 76 of the wrench 300 looks horizontal, the deflector 2 inside the wrench 300 is also in the horizontal position correctly as illustrated in FIG. 2. A level can be placed on the third flat surface 76 of the wrench 300 to adjust the deflector 2 to the right position. Alternatively, the deflector 2 can be adjusted to the right position by using a thread having a weight at the end and aligning the vertical portion 77 of the wrench 300 with the thread.

A second installation guide marker 78, which is configured similarly to the first installation guide marker 58 described above, is formed on the outer peripheral surface of the wrench 300. When the sidewall sprinkler head 100 with the protective cap 200 mounted thereon is accommodated in the wrench 300 (see FIG. 11), the second installation guide marker 78 comes to the same position as the first installation guide marker 58 of the protective cap 200. The wrench 300 has openings 79 formed through the peripheral wall of the wrench 300. Accordingly, the alignment of the second installation guide marker 78 with the first installation guide marker 58 can be observed easily through the openings 79.

The first installation guide marker 58 and the second installation guide marker 78 are both examples of an "installation guide marker for accessory". The first installation guide marker 58 is also an example of an "installation guide marker for protective cap", and the second installation guide marker 78 is an example of an "installation guide marker for wrench".

Figure 14:
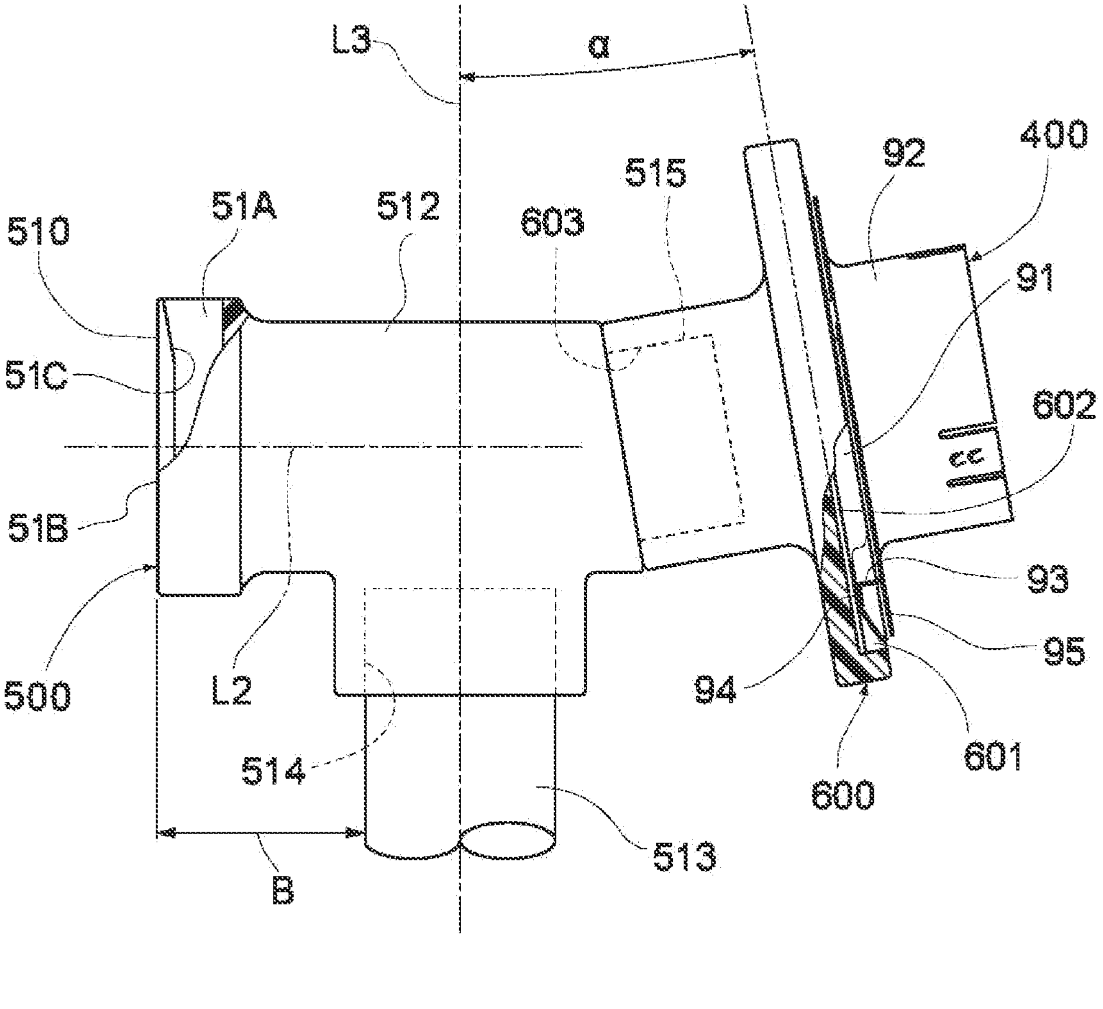
FIG. 14 is a side view of the demounting tool of FIG. 13 to which a cover-plate mounting tool is connected.
Figure 15A:
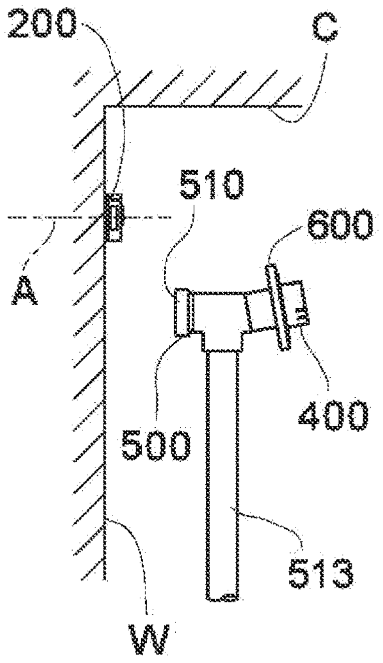
FIG. 15 includes views for explaining steps from the removal of the protective cap to the mounting of the cover plate using the tool of FIG. 14.
Figure 15B:
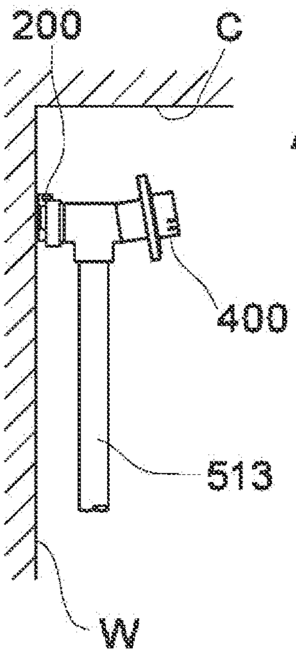
Figure 15C:
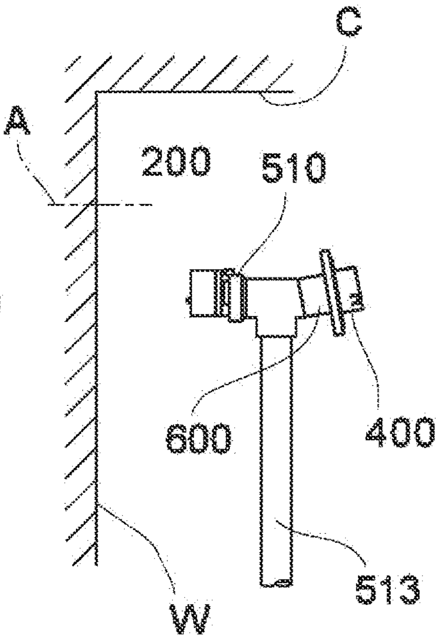
Figure 15D:
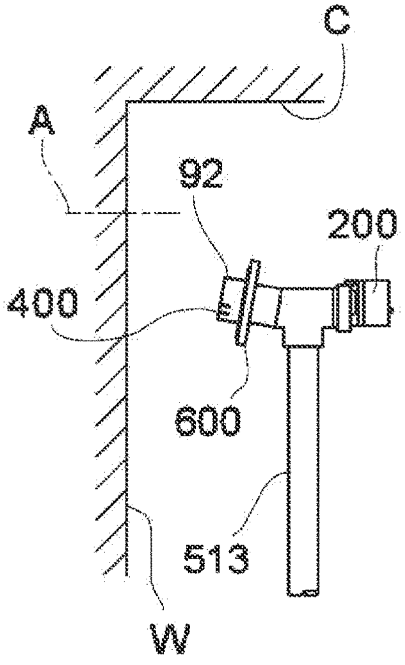
Figure 15E:
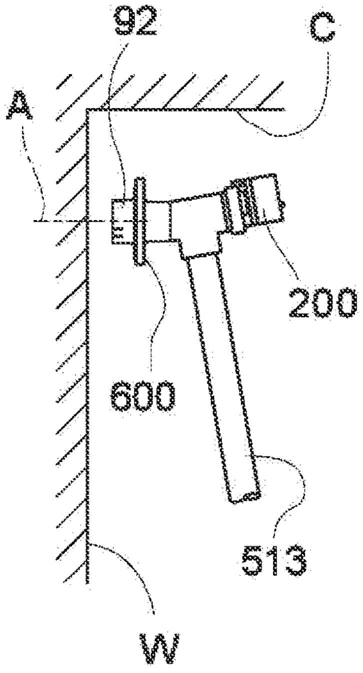
Figure 15F:
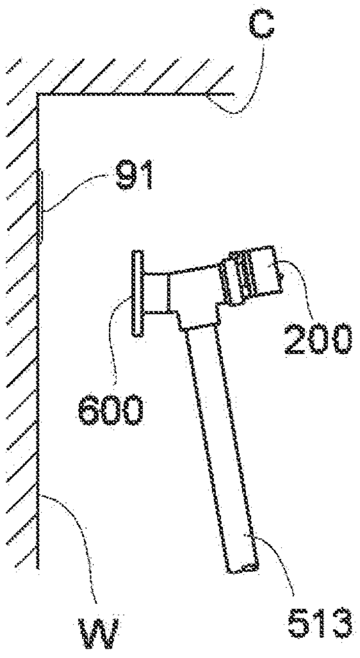

Cover Plate 400 (See FIG. 14)

In an embodiment, the accessory is a cover plate 400.

After the sidewall sprinkler head 100 is connected to the water pipe P and the side wall W is constructed, the protective cap 200 is demounted, and the cover plate 400 is mounted on the frame 16. The cover plate 400 includes a disc-like plate 91 and a tube-like retainer 92. Multiple legs 93 are formed at one end of the retainer 92.

The tip end of each leg 93 extends parallel to the plate 91 and is joined to the plate 91 using a fusible alloy 94. The fusible alloy 94 has a melting point lower than that of the fusible alloy used in the heat-sensitive member 3.

The retainer 92 has a projection 95 that comes into contact with the side wall W. When the retainer 92 is mounted on the frame 16 after the protective cap 200 is removed from the sidewall sprinkler head 100, the retainer 92 is pushed to the side wall W until the projection 95 comes into contact with the side wall W. As a result, a small gap is formed between the side wall W and the edge of the plate 91.

Demounting Tool 500 and Method of Mounting/Demounting Accessory Using Demounting Tool 500 (See FIGS. 12 to 15)

The above-described steps of removing the protective cap 200 and mounting the cover plate 400 can be performed efficiently using a tool described below. In an embodiment, the accessory is a demounting tool 500.

Figure 12:
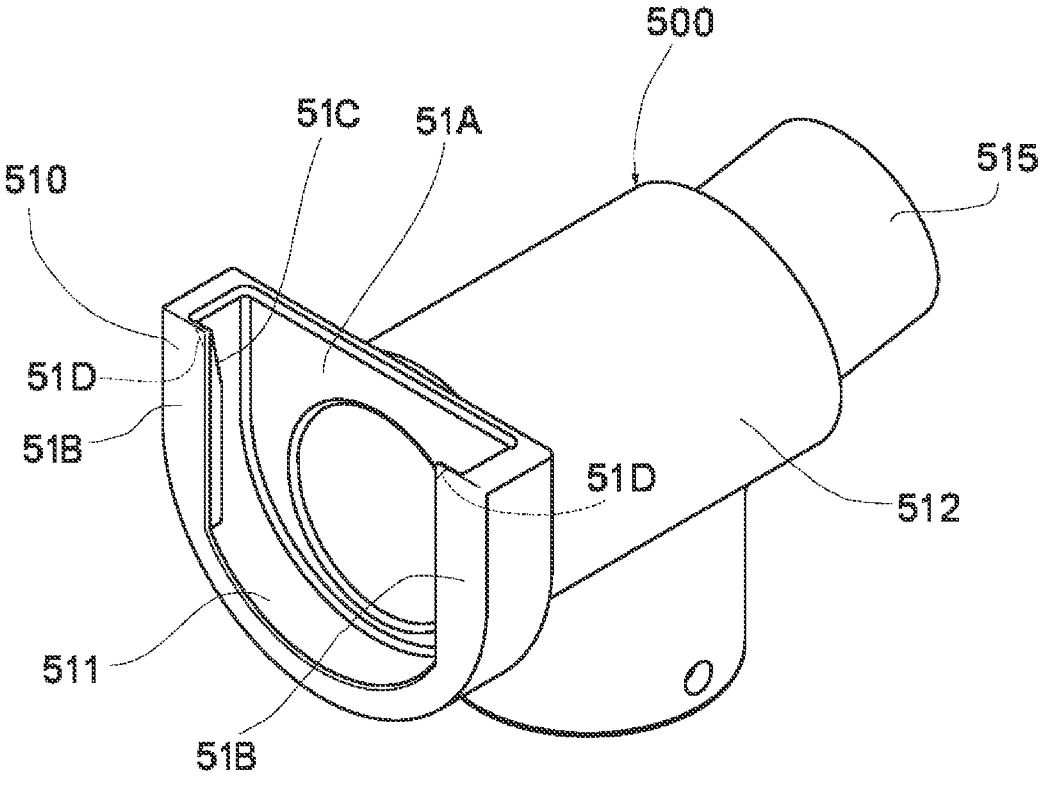
FIG. 12 is a perspective view illustrating a demounting tool.

The demounting tool 500 illustrated in FIG. 12 is used to demount the protective cap 200. The demounting tool 500 includes cap engagement portions 510 configured to engage the protective cap 200. More specifically, the cap engagement portions 510 can engage respective vertical grooves 57 of the protective cap 200.

As illustrated in FIG. 12, the demounting tool 500 also includes a cap receiver portion 511 below a pair of the cap engagement portions 510 (at a position near the floor). The cap receiver portion 511 is an arcuate groove that can accommodate the peripheral-wall extension 54. An open space 51A is formed in the demounting tool 500 above the cap engagement portions 510 (at a position near the ceiling). The demounting tool 500 is structured such that the peripheral-wall extension 54 can be inserted in between the cap engagement portions 510, or can be drawn therefrom, through the open space 51A.

When the tip ends of the cap engagement portions 510 are inserted into respective vertical grooves 57, the cap receiver portion 511 supports the peripheral-wall extension 54. After the protective cap 200 is demounted from the sidewall sprinkler head 100, the cap receiver portion 511 continues to hold the peripheral-wall extension 54 and prevents the protective cap 200 from coming off the demounting tool 500.

The protective cap 200 has brim portions 57*b* that are formed at the peripheral-wall extension 54 so as to adjoin respective vertical grooves 57. The brim portions 57*b* serve as groove walls for the vertical grooves 57. Each cap engagement portion 510 includes an outer portion 51B that faces the side wall W and an inner portion 51C that engages each brim portion 57*b* when the protective cap 200 is demounted. A top part of the inner portion 51C (the end portion near the ceiling) is inclined toward the outer portion 51B. An engaging part of the inner portion 51C that engages the corresponding vertical groove 57 functions as an engagement protrusion. As indicated by dotted line in FIG. 12, a corner 51D of each cap engagement portion 510, which is the inner edge of the tip end, may be chamfered or rounded. The chamfered or rounded corner 51D enables each cap engagement portion 510 to enter the vertical groove 57 smoothly.

As illustrated in FIG. 12, the demounting tool 500 includes a housing 512, and the cap engagement portions 510 and the cap receiver portion 511 are formed in the housing 512. The cap engagement portions 510 and the cap receiver portion 511 are formed at one end of the housing 512, and a worker can grab the housing 512 to use the demounting tool 500.

Figure 13:
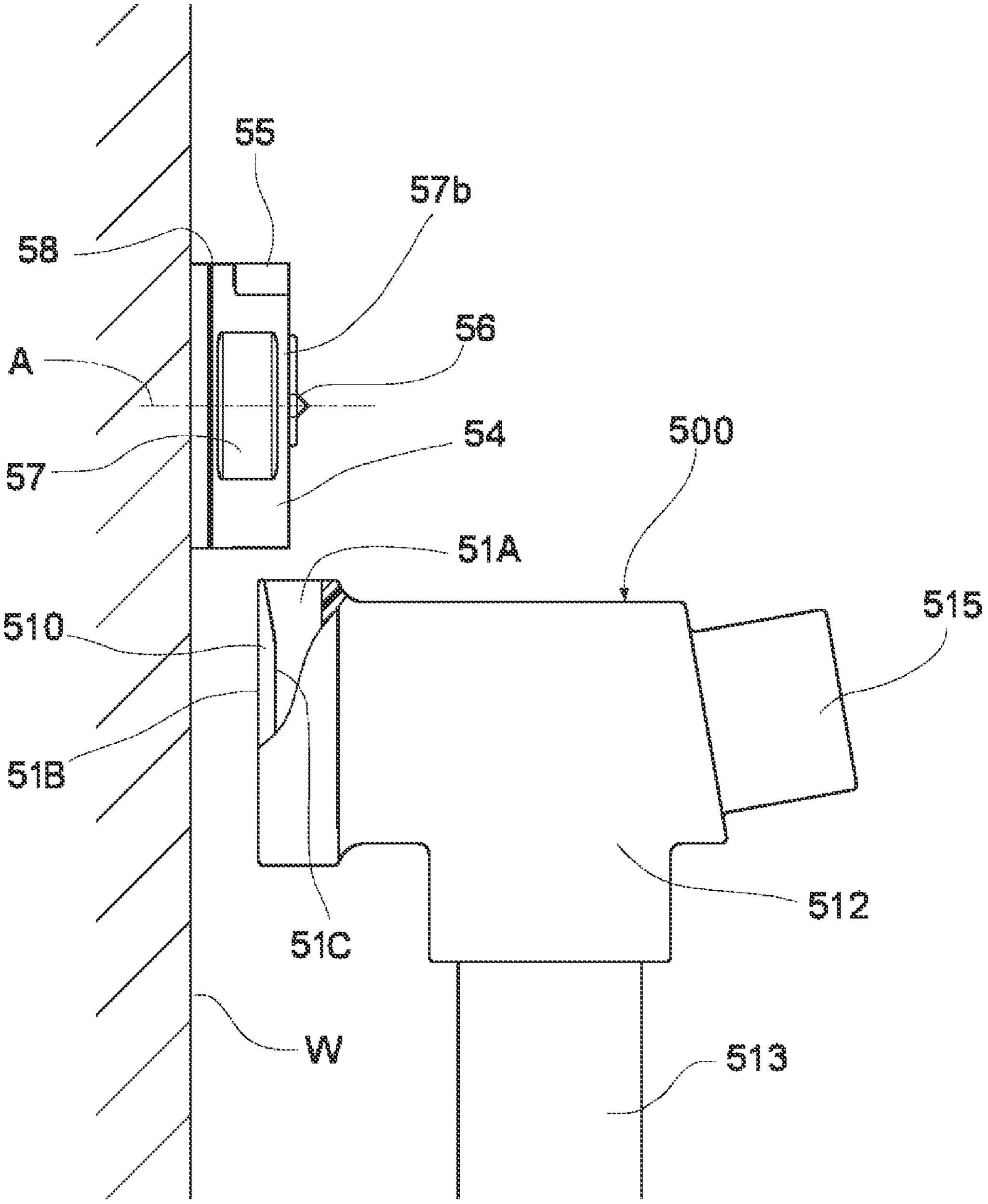
FIG. 13 is a view illustrating a state when the protective cap is demounted using the demounting tool.

In the example illustrated in FIG. 13, the demounting tool 500 includes a rod 513. A worker uses the demounting tool 500 with the rod 513 to demount the protective cap 200 positioned at the side wall W near the ceiling of the room without using a stepladder or a stepstool, which can improve work efficiency and safety.

The demounting tool 500 illustrated in FIG. 13 is shaped like the letter T. More specifically, the housing 512 forms the horizontal bar of the letter T, and the rod 513 forms the vertical bar. The cap engagement portions 510 and the cap receiver portion 511 are formed at one end of the housing 512. The rod 513 extends so as to intersect the central axis of the tube-like housing 512.

As illustrated in FIG. 13, a worker places the cap engagement portions 510 below the protective cap 200 and moves the cap engagement portions 510 along the side wall W toward the ceiling (upward in FIG. 13). Then, the peripheral-wall extension 54 of the protective cap 200 enter the open space 51A, and the vertical grooves 57 engage respective cap engagement portions 510. The worker can remove the protective cap 200 from the sidewall sprinkler head 100 by moving the demounting tool 500 away from the side wall W.

In the example illustrated in FIG. 14, the demounting tool 500, which has the same structure as in FIG. 13, also includes a cover-plate mounting tool 600 at the other end of the housing 512. As illustrated in FIG. 14, the demounting tool 500 and the cover-plate mounting tool 600 can be integrated as one tool. The protective cap 200 can be demounted and the cover plate 400 can be mounted successively using this tool, which can improve work efficiency greatly.

In FIG. 14, the rod 513 extends in a direction intersecting an axis L2 of the housing 512. In the present embodiment, an axis L3 of the rod 513 extends vertically relative to the axis L2 of the housing 512. A distance B between the rod 513 and the cap engagement portions 510 is approximately 20 mm to 200 mm. This enables a worker to put his or her hand between the side wall W and the rod 513. The housing 512 has an insertion hole 514 for the connection with the rod 513.

The cover-plate mounting tool 600 is shaped like a disc plate. The cover-plate mounting tool 600 has a recess 601 that can accommodate and hold the plate 91 of the cover plate 400. A magnet 602 is disposed at the bottom of the recess 601 that accommodates the cover plate 400. The ends of the legs 93 of the retainer 92 are made of steel, the magnet 602 attracts the legs 93 to hold the cover plate 400 inside the recess 601.

The cover-plate mounting tool 600 has a hole 603 behind the recess 601, and the hole 603 is used for the connection with the housing 512. The housing 512 has a corresponding joint portion 515 to which the cover-plate mounting tool 600 is attached. The housing 512 has the cap engagement portions 510 at one end thereof and the joint portion 515 at the other end positioned opposite to the one end. The joint portion 515 includes a projection for engaging the hole 603. The joint portion 515 is formed so as to incline with the end being closer to the ceiling. As illustrated in FIG. 14, the bottom surface of the recess 601 for accommodating the cover plate 400 inclines at an angle $\alpha$ of 5° or more and 15° or less with respect to the axis L3 of the rod 513 extending vertically.

Next, a procedure of demounting the protective cap 200 from the sidewall sprinkler head 100 and mounting the cover plate 400 using the tool illustrated in FIG. 14 will be described with reference to FIG. 15.

As illustrated in FIG. 15 (1), the sidewall sprinkler head 100 is disposed at the side wall W approximately 100 mm below a ceiling C. The sidewall sprinkler head 100 is connected to the water pipe P behind the side wall W with the protective cap 200 being mounted thereon, and the peripheral-wall extension 54 of the protective cap 200 protrudes into the room from a hole H formed through the side wall W. The peripheral-wall extension 54 of the protective cap 200 protruding from the side wall W has the vertical grooves 57 and the flanges 57*b* adjoining respective vertical grooves 57.

The sidewall sprinkler head 100 is installed such that the second flat surface 55 of the protective cap 200 is positioned parallel to the floor of the building, in other words, the deflector 2 is disposed at the right position.

A worker sets the cover plate 400 to the recess 601 of the cover-plate mounting tool 600 before demounting the protective cap 200. As described above, the magnet 602 attracts and holds the cover plate 400 in the recess 601.

When the protective cap 200 is removed using the demounting tool 500, the worker orients the cap engagement portions 510 toward the side wall W and causes the cap engagement portions 510 to engage the flanges 57*b* of the vertical grooves 57 of the protective cap 200 (see FIG. 15 (2)). Here, the worker moves the demounting tool 500 along the side wall W closer to the peripheral-wall extension 54 from below and inserts the cap engagement portions 510 into the vertical grooves 57.

More specifically, the vertical grooves 57 enter the open space 51A and engage respective cap engagement portions 510, and the peripheral-wall extension 54 of the protective cap 200 is accommodated in between the cap engagement portions 510. When the worker pulls the demounting tool 500 in a direction away from the side wall W, the protective cap 200 moves together with the demounting tool 500 due to the engagement between the flanges 57*b* and the cap engagement portions 510. As a result, the protective cap 200 is detached from the sidewall sprinkler head 100 (see FIG. 15 (3)).

The protective cap 200 is held by the cap receiver portion 511, which maintains the engagement between the protective cap 200 and the demounting tool 500. In this state, the worker rotates the rod 513 by 180° about the axis L3 and orients the cover plate 400 toward the side wall W (see FIG. 15 (4)). The sidewall sprinkler head 100 from which the protective cap 200 is removed is exposed at the side wall W.

Next, as illustrated in FIG. 15 (5), the worker inclines the rod 513 relative to the side wall W and aligns the axis of the retainer 92 with the central axis A of the nozzle 11. The worker moves the cover-plate mounting tool 600 toward the side wall W and covers the frame 16 with the retainer 92. Here, the rod 513 inclines by 5° to 15° relative to the side wall W. In other words, the demounting tool 500 is structured such that the worker can push the cover plate 400 easily toward the side wall W.

When the projection 95 of the retainer 92 comes into contact with the side wall W, the worker moves the cover-plate mounting tool 600 away from the side wall W. The cover plate 400 attracted by the magnet 602 is detached from the recess 601, which completes the mounting of the cover plate 400 (see FIG. 15 (6)).

Other Advantageous Effects of Embodiment

Other advantageous effects of the present invention not described in the above embodiments will be described.

The engagement portions (the tongue portions 53) of the protective cap 200 for the engagement with the main body 1 engage the recesses 18 of the main body 1, which determines the engagement position between the main body 1 and the protective cap 200 and thereby determines the positional relationship between the first flat surface 17 and the second flat surface 55. Similarly, the engagement portions (the projections 74 and the flat surface 75) of the wrench 300 for the engagement with the main body 1 engage the recesses 18 and the first flat surface 17 of the main body 1, which determines the engagement position between the main body 1 and the wrench 300 and thereby determines the positional relationship between the first flat surface 17 and the vertical portion 77.

Accordingly, when the protective cap 200 is mounted on the sidewall sprinkler head 100, the position of the protective cap 200 is restricted, which prevents the protective cap 200 from being mounted at a wrong position on the sidewall sprinkler head 100 during the mounting work. The same applies to the case of the wrench 300 being mounted on the sidewall sprinkler head 100.

The verticality of the wall segment 56*a*, the vertical grooves 57, and the groove 59 of the protective cap 200 and the verticality of the vertical portion 77 of the wrench 300 can be confirmed roughly by observation with respect to the floor of the building.

As illustrated in FIGS. 1 and 5, the Y-shaped projection 56 of the protective cap 200 is formed so as to extend radially from the center of the closed surface 51. The second flat surface 55 is positioned in the extending direction of the wall segment 56*a*. The recesses 18 of the main body 1 are disposed in the extending directions of the wall segments 56*b* and 56*c*, respectively. A worker can install the wrench 300 appropriately over the sidewall sprinkler head 100 having the protective cap 200 with the second flat surface 55 and the projection 56 serving as guides.

After the sidewall sprinkler head 100 is connected to the water pipe P, the worker on the floor needs to use a stage such as a stepladder in order to observe the first flat surface 17 and the second flat surface 55 that are disposed near the ceiling. The position of the deflector 2, however, can be confirmed by observing the wall segment 56*a*.

The first installation guide marker 58 of the protective cap 200 is positioned near the closed surface 51, and the peripheral-wall extension 54 protrudes from the side wall W into the room. The provision of the second flat surface 55 on the peripheral-wall extension 54 enables the worker to place a level on the second flat surface 55 to check the horizontality after the side wall W is constructed. The provision of the vertical grooves 57 at the peripheral-wall extension 54 enables the worker to find the positions of the vertical grooves 57 easily and remove the protective cap 200 without touching the side wall W.

The cap engagement portions 510 and the cap receiver portion 511 are disposed so as to form the letter U in the demounting tool 500 in FIG. 12. However, the cap engagement portions 510 and the cap receiver portion 511 may be disposed so as to form the letter V. In this case, the cap engagement portions 510 are disposed obliquely, and the cap receiver portion 511 is disposed where the cap engagement portions 510 intersect each other.

REFERENCE SIGNS LIST

100 sidewall sprinkler head
200 protective cap
300 wrench
400 cover plate
500 demounting tool

The invention claimed is:

1. An accessory for a sidewall sprinkler head, the accessory being configured to be mounted on and demounted from a sidewall sprinkler head equipped with a deflector, the accessory comprising:
- a tubular member configured to accommodate the sidewall sprinkler head therein, wherein
- the tubular member includes an engagement portion and an alignment indicator for accessory,
- the engagement portion is configured to engage the sidewall sprinkler head so as to turn together with the sidewall sprinkler head,
- the alignment indicator for accessory is configured to indicate a positional state of the deflector, and
- the tubular member includes an installation guide marker formed on an outer peripheral surface of the tubular member, the installation guide marker indicating an acceptable range of installation position of the sidewall sprinkler head with respect to a room-side surface of a side wall.

2. The accessory for the sidewall sprinkler head according to claim 1, wherein
- the alignment indicator for accessory includes a second alignment indicator, and
- the second alignment indicator is a vertical groove formed at an outer surface of the tubular member.

3. The accessory for the sidewall sprinkler head according to claim 2, wherein
- the accessory is a protective cap for the sidewall sprinkler head, and
- the vertical groove is a groove that is formed at an outer peripheral surface of the protective cap so as to extend in a direction normal to a horizontally positioned first flat surface of the sidewall sprinkler head.

4. The accessory for the sidewall sprinkler head according to claim 1, wherein
- the alignment indicator for accessory includes a second alignment indicator, and
- the second alignment indicator is a groove formed at an outer surface of the tubular member.

5. The accessory for the sidewall sprinkler head according to claim 1, wherein
- the alignment indicator for accessory includes a first alignment indicator,
- the first alignment indicator is a horizontal surface,
- the accessory is a protective cap for the sidewall sprinkler head, and
- the horizontal surface is a second flat surface that is formed at the protective cap so as to extend parallel to a horizontally positioned first flat surface of the sidewall sprinkler head.

6. The accessory for the sidewall sprinkler head according to claim 1, wherein
- the alignment indicator for accessory includes a first alignment indicator,
- the first alignment indicator is a horizontal surface,
- the accessory is a wrench to be used to connect the sidewall sprinkler head to a water pipe, and
- the horizontal surface is a third flat surface that is formed at the wrench so as to extend parallel to a horizontally positioned first flat surface of the sidewall sprinkler head.

7. The accessory for the sidewall sprinkler head according to claim 1, wherein
- the alignment indicator for accessory includes a second alignment indicator,
- the second alignment indicator is a vertical projection formed on an outer surface of the tubular member,
- the accessory is a protective cap for the sidewall sprinkler head, and
- the vertical projection is a projection that is formed at the protective cap so as to extend in a direction normal to a horizontally positioned first flat surface of the sidewall sprinkler head.

8. The accessory for the sidewall sprinkler head according to claim 1, wherein
- the alignment indicator for accessory includes a second alignment indicator,
- the second alignment indicator is a vertical projection formed on an outer surface of the tubular member,
- the accessory is a wrench to be used to connect the sidewall sprinkler head to a water pipe, and
- the vertical projection is a vertical portion that is formed at the wrench so as to extend in a direction normal to a horizontally positioned first flat surface of the sidewall sprinkler head.

9. The accessory for the sidewall sprinkler head according to claim 1, wherein
- the accessory is a protective cap for the sidewall sprinkler head, and
- the installation guide marker is formed on an outer peripheral surface of the protective cap.

10. The accessory for the sidewall sprinkler head according to claim 1, wherein
- the accessory is a wrench to be used to connect the sidewall sprinkler head to a water pipe, and
- the installation guide marker is formed on an outer peripheral surface of the wrench.

11. The accessory for the sidewall sprinkler head according to claim 10, wherein
- the wrench has an opening formed so as to intersect the installation guide marker,
- the other installation guide marker is formed on a protective cap of the sidewall sprinkler head accommodated in the wrench, and
- the installation guide marker formed on the protective cap is exposed through the opening.

12. The accessory for the sidewall sprinkler head according to claim 1, wherein
- the engagement portion is a tongue portion configured to engage the sidewall sprinkler head in a rotation direction of the tubular member about a central axis of the tubular member.

13. The accessory for the sidewall sprinkler head according to claim 1, wherein the engagement portion is a projection formed on an inner peripheral surface of the tubular member, the projection being configured to engage the sidewall sprinkler head in a rotation direction of the tubular member about a central axis of the tubular member.

14. The accessory for the sidewall sprinkler head according to claim 1, wherein the engagement portion is a flat surface formed on an inner peripheral surface of the tubular member, the flat surface being configured to engage the sidewall sprinkler head in a rotation direction of the tubular member about a central axis of the tubular member.

15. A tool for demounting a protective cap from a sidewall sprinkler head, the tool being configured to demount the protective cap from the sidewall sprinkler head installed at a side wall, the protective cap is configured to be mounted on and demounted from the sidewall sprinkler head equipped with a deflector, the protective cap is a tubular member configured to accommodate the sidewall sprinkler head therein, the tubular member includes an engagement portion and an alignment indicator, the engagement portion is configured to engage the sidewall sprinkler head so as to turn together with the sidewall sprinkler head, the alignment indicator is configured to indicate a positional state of the deflector, the alignment indicator includes a second alignment indicator, the second alignment indicator is a vertical groove formed at an outer surface of the tubular member, the vertical groove is a groove that is formed at an outer peripheral surface of the protective cap so as to extend in a direction normal to a horizontally positioned first flat surface of the sidewall sprinkler head, the tool includes a cap engagement portion and a cap receiver portion, the cap engagement portion has a projection configured to engage the vertical groove of the protective cap, the cap receiver portion is formed as a groove configured to hold the outer peripheral surface of the protective cap, and the tool is configured to demount the protective cap from the sidewall sprinkler head by pulling the tool away from the side wall with the cap engagement portion engaging the vertical groove.

16. The tool for demounting the protective cap from the sidewall sprinkler head according to claim 15, wherein the protective cap includes a flange disposed so as to adjoin the vertical groove, and the cap engagement portion is configured to engage the flange.

17. The tool for demounting the protective cap from the sidewall sprinkler head according to claim 16, wherein the cap engagement portion includes an outer portion positioned so as to face the side wall, and an inner portion positioned opposite to the outer portion and configured to engage the flange, and the inner portion inclines such that an upper part of the inner portion comes closer to the outer portion.

18. The tool for demounting the protective cap from the sidewall sprinkler head according to claim 15, wherein the tool is shaped like a letter T, and the tool includes a housing positioned so as to correspond to a horizontal bar of the letter T and a rod positioned so as to correspond to a vertical bar of the letter T, the housing includes the cap engagement portion and the cap receiver portion that are disposed at one end of the housing, and the rod extends in a direction intersecting an axis of the housing.

19. The tool for demounting the protective cap from the sidewall sprinkler head according to claim 18, wherein the rod is disposed at a position away from the cap engagement portion.

20. The tool for demounting the protective cap from the sidewall sprinkler head according to claim 18, wherein the tool further includes a cover-plate mounting tool disposed at another end of the housing.

21. The tool for demounting the protective cap from the sidewall sprinkler head according to claim 18, wherein the cover-plate mounting tool has a recess configured to hold a cover plate, and the recess has a bottom on which the cover plate is placed, the bottom inclining at an angle of 5° or more and 15° or less from an axis of the rod.

* * * * *